United States Patent
Julicher et al.

[11] Patent Number: 5,727,590
[45] Date of Patent: *Mar. 17, 1998

[54] TAMPER RESISTANT CONSTRUCTION FOR HYDRANT ACTUATING NUT

[75] Inventors: Bradley J. Julicher, Williamsville; Thomas R. Lanham, Boston, both of N.Y.

[73] Assignee: McGard, Inc., Orchard Park, N.Y.

[*] Notice: The term of this patent shall not extend beyond the expiration date of Pat. No. 5,630,442.

[21] Appl. No.: 821,277

[22] Filed: Mar. 20, 1997

Related U.S. Application Data

[63] Continuation-in-part of Ser. No. 651,294, Jun. 7, 1996, Pat. No. 5,630,442.

[51] Int. Cl.$^6$ .................. F16K 35/06; E03B 9/06
[52] U.S. Cl. .................. 137/296; 81/124.3; 81/125.1; 137/582.5; 137/800; 220/284; 220/725; 220/726; 220/727; 251/214; 251/291
[58] Field of Search ............... 81/124.3, 125, 81/125.1; 137/296, 371, 377, 382, 382.5, 800; 220/284, 724, 725, 726, 727; 251/214, 291, 292

[56] References Cited

U.S. PATENT DOCUMENTS

| | | | |
|---|---|---|---|
| Re. 27,616 | 4/1973 | Diaz | 137/382.5 |
| 2,576,631 | 11/1951 | Mueller et al. | 137/307 |
| 2,762,386 | 9/1956 | Fogle | 137/296 |
| 3,070,115 | 12/1962 | Jester | 137/296 |
| 3,450,148 | 6/1969 | Mongelluzzo et al. | 137/296 |
| 3,453,897 | 7/1969 | Adinolfi | 74/89.15 |
| 3,626,961 | 12/1971 | Quinones | 137/296 |
| 3,709,249 | 1/1973 | Diaz | 137/296 |
| 3,840,041 | 10/1974 | McMurray | 137/296 |
| 3,916,939 | 11/1975 | Gillard | 137/296 |
| 3,935,877 | 2/1976 | Franceschi | 137/296 |
| 4,033,372 | 7/1977 | Bowman | 137/296 |
| 4,369,807 | 1/1983 | Camp | 137/296 |
| 4,526,193 | 7/1985 | Drach | 137/296 |
| 4,566,481 | 1/1986 | Leopold, Jr. et al. | 137/296 |
| 4,620,428 | 11/1986 | Kopesky | 70/175 |
| 4,633,896 | 1/1987 | Bainbridge et al. | 137/296 |
| 4,716,922 | 1/1988 | Camp | 137/296 |
| 4,936,336 | 6/1990 | McCauley et al. | 137/296 |
| 5,205,312 | 4/1993 | Jerman et al. | 137/296 |

FOREIGN PATENT DOCUMENTS

734267  4/1943  Germany .................. 137/296

Primary Examiner—George L. Walton
Attorney, Agent, or Firm—Joseph P. Gastel

[57] ABSTRACT

A tamper resistant construction for preventing unauthorized actuation of the hydrant nut of a fire hydrant by causing any lateral pounding or upward forces applied to the tamper resistant construction to be transmitted directly to the hydrant body cover of the fire hydrant including a packing nut threaded into the hydrant body cover proximate the hydrant nut, a hydrant nut actuating body located within the packing nut and mounted on the hydrant nut in turning relationship therewith, a shroud permanently or removably rotatably mounted on the packing nut in closely spaced relationship to a cap rotatably mounted on the hydrant nut actuating body, and a configuration on the hydrant nut actuating body between the cap and the shroud for receiving a special wrench.

33 Claims, 5 Drawing Sheets

TAMPER RESISTANT CONSTRUCTION FOR HYDRANT ACTUATING NUT

CROSS-REFERENCE TO RELATED APPLICATIONS

The present application is a continuation-in-part of application Ser. No. 08/651,294, filed Jun. 7, 1996, now U.S. Pat. No. 5,630,442, dated May 20, 1997.

BACKGROUND OF THE INVENTION

The present invention relates to an improved tamper resistant construction for preventing unauthorized turning of the actuating nut of a fire hydrant and it is an improvement over the construction disclosed in U.S. Pat. No. 4,936,336.

By way of background, as is well known, unmodified fire hydrants can be opened by anyone having a wrench which can turn the hydrant nut, which can result in the unauthorized use of water. In prior tamper resistant constructions, such as shown in the above-mentioned U.S. Pat. No. 4,936,336, any pounding or wedging action applied to the tamper resistant construction, in an attempt to disable it, is transmitted directly to the hydrant nut which is usually fabricated from brass and can be less than one square inch in cross section and is thus susceptible to breakage. If it should break, the entire tamper resistant construction can be removed from the hydrant and access can be had to the remaining portion of the hydrant nut to thereby unauthorizedly turn it or the hydrant can be rendered inoperable.

BRIEF SUMMARY OF THE INVENTION

It is accordingly the object of the present invention to provide an improved tamper resistant construction for the nut of a fire hydrant which can be installed easily and simply on an existing fire hydrant and which will transmit any forces applied thereto directly to the massive cast iron hydrant body and not directly to the more delicate hydrant actuating nut. Other objects and attendant advantages of the present invention will readily be perceived hereafter.

The present invention relates to a tamper resistant construction for preventing unauthorized actuation of a fire hydrant comprising a packing nut, a hydrant nut actuating body rotatably mounted on said packing nut, a shroud, and a rotatable connection between said hydrant nut actuating body and said shroud.

The present invention also relates to a construction for rendering a hydrant nut tamper resistant comprising a packing nut, a hydrant nut actuating body having upper and lower ends with said lower end positioned within said packing nut, an opening in said lower end of said hydrant nut actuating body for receiving a hydrant nut, a shroud rotatably mounted on said packing nut, and a cap rotatably mounted on said hydrant nut actuating body proximate said shroud.

The present invention also relates to a tamper resistant construction for a fire hydrant having a hydrant body and a hydrant cover mounted on said hydrant body and a hydrant shaft having an upper portion with a valve-actuating polygonal nut positioned at said upper portion of said hydrant shaft and extending outwardly from said hydrant cover, said construction for rendering said nut tamper resistant against unauthorized actuation comprising a packing nut threaded into said hydrant cover proximate to said upper portion of said hydrant shaft, a hydrant nut actuating body, a recess in said hydrant nut actuating body for receiving said polygonal nut in tutoring relationship, a shroud positioned in encircling relationship to said packing nut and having a lower portion positioned proximate said hydrant cover, a first rotatable connection between said shroud and said packing nut for permitting free rotation of said shroud on said packing nut, a cap mounted on said hydrant nut actuating body proximate said shroud, and a second rotatable connection between said cap and said hydrant nut actuating body.

The various aspects of the present invention will be more fully understood when the following portions of the specification are read in conjunction with the accompanying drawings wherein:

DETAILED DESCRIPTION OF THE INVENTION

The improved construction 10 for rendering polygonal nut 11 of fire hydrant 12 tamper resistant against unauthorized actuation includes four basic parts, namely, a hydrant nut actuating body 13 which engages hydrant nut 11 in turning relationship, a shroud 14 rotatably mounted on hydrant nut actuating body 13, a cap 15 rotatably mounted on hydrant nut actuating body 13 and a packing nut 16 which is threadably attached to the hydrant cover 17 and which rotatably supports the hydrant nut actuating body 13. The difference between the present construction 10 and the construction set forth in U.S. Pat. No. 4,936,336 is that any forces which are applied to either the cap 15 or the shroud 14 are transmitted directly to the hydrant cover 17 and thereafter to the hydrant body 18, whereas in the construction of U.S. Pat. No. 4,936,336 any lateral pounding force applied to cap 15 or shroud 14 is applied directly to the hydrant actuating nut 11 which is susceptible of fracture.

Figure 6:
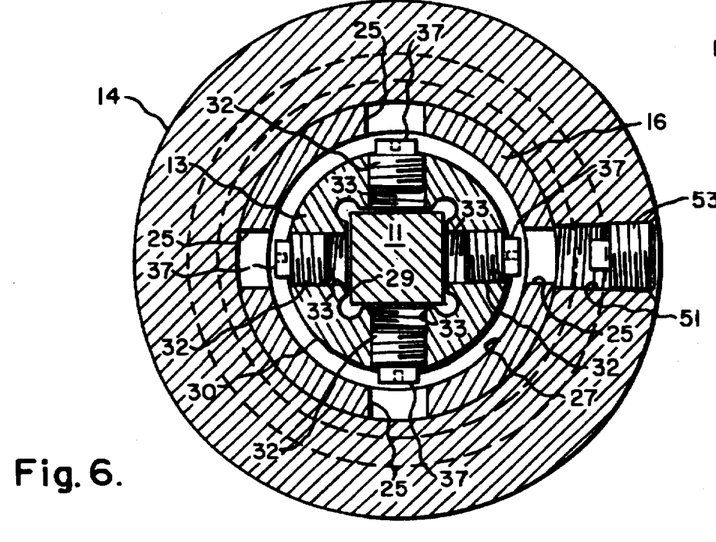
FIG. 6 is a cross sectional view taken substantially along line 6—6 of FIG. 2 and showing the manner in which the studs provide a rotatable locking engagement between the hydrant nut actuating body and the packing ring.
Figure 9:
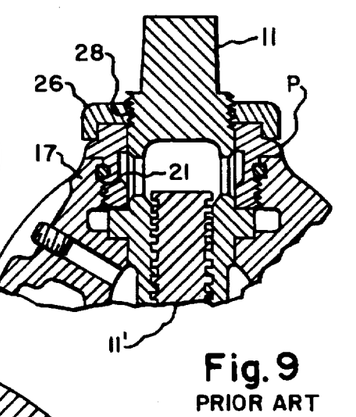
FIG. 9 is a fragmentary cross sectional view of a prior art hydrant construction taken in a direction analogous to line 2—2 of FIG. 1.

In order to install the improved tamper resistant construction onto an existing hydrant, the normal prior art packing nut P (FIG. 9) is unthreaded from hydrant cover 17 after dust shield 26 has been unthreaded from hydrant nut 11 at threads 28. Thereafter, the annular packing nut 16 which forms a part of the present invention and which has threads 20 thereon is threadably secured to the threads 21 of hydrant cover 17 with a O-ring seal 22 therebetween. A bore 23 in the body 24 of the packing nut receives the end of a bar for turning the packing nut 16 into its threaded engagement. The packing nut 16 has a plurality of bores 25 (FIG. 6) therein which are in communication with an internal circumferential groove 27 in the packing nut.

After the packing nut 16 has been installed, an assembly of the hydrant nut actuating body 13, shroud 14 and cap 15 is secured to packing nut 16. In this respect, shroud 14 is mounted on hydrant nut actuating body 13 with a snap ring 39 which fits between groove 40 of shroud 14 and groove 41 of hydrant nut actuating body 13. Cap 15 is mounted on hydrant nut actuating body 13 by a snap ring 45 which fits between groove 47 of cap 15 and groove 49 of hydrant nut actuating body 13. O-ring seals 48 and 42 fit in grooves 50 and 43, respectively, of hydrant nut actuating body 13. The foregoing assembly utilizing snap rings 45 and 39 permits the cap 15 and shroud 14, respectively, to be freely rotatably mounted on hydrant nut actuating body 13 without turning it.

The foregoing assembly of the hydrant nut actuating body 13, shroud 14 and cap 15 is then installed on the previously installed packing nut 16. In this respect the hydrant nut actuating body 13 includes a polygonal recess 29 for receiving the polygonal nut 11 in turning relationship when the lower body portion 30 of hydrant nut actuating body 13 is positioned within cylindrical bore 31 of packing nut 16. The hydrant nut actuating body 13 is maintained in assembled relationship with packing nut 16 by a plurality of studs 32. In this respect studs 32 are threadably received in bores 33 of hydrant nut actuating body 13, and before the lower body portion 30 of actuating nut body 13 can be installed into cylindrical bore 31 of packing nut 16, the studs 32 are threaded all the way into bores 33 so that their ends do not project outwardly therefrom. After hydrant nut actuating body 13 has been inserted into bore 31 so that shoulder 34 engages shoulder 35, the bores 33 with the studs 32 therein will be in alignment with internal annular groove 27 of packing nut 16. Thereafter, the hydrant nut actuating body 13 with the polygonal nut 11 in polygonal bore 29 is rotated so that a bore 33 is in alignment with one of the stud accessing bores 25 in packing nut 16. When one of the bores 33 is aligned with one of the accessing bores 25, each of the bores 33 will be aligned with a respective bore 25. At this point it is to be noted that the foregoing alignment between one of the bores 33 with one of the bores 25 is effected by first aligning the bore 51 in shroud 14 with one of the bores 25 in the packing nut 16 and thereafter rotating the hydrant nut actuating body 13 until one of the bores 33 of the hydrant nut actuating body is aligned with the previously aligned bores 51 and 25.

A suitable matching tool such as an Allen wrench or a screw driver, is then inserted through the aligned bores 51 in shroud 14 and the bore 25 in packing nut 16 to engage the head 37 of a stud 32 to back it out so that the head 37 extends into annular groove 27. The shroud 14 can be rotated so that tapered threaded bore 51 therein will be in alignment with each accessing bore 25 of packing nut 16 which is in alignment with each threaded bore 33 of hydrant nut actuating body 13. Thus, each of the studs 32 can be accessed through the aligned bores 51 and 25 to rotatably connect the hydrant nut actuating body 13 to the packing nut 16. The foregoing alignment among bores 51, 25 and 33 is also effected in the event it is necessary to disconnect hydrant nut actuating body 13 from packing ring 16 in order to remove it and the shroud 14 and cap 15 assembled therewith from hydrant nut 11. However, to prevent unauthorized access to studs 32, a plug 53 is threaded into tapered bore 51 by means of a wrench 54 which has a curvilinear ridge configuration 55 thereon which mates with curvilinear groove 57 of plug 53.

When the tamper resistant assembly 10 is fully assembled, the lowermost edge 59 of cap 15 is spaced a very short distance from the upper edge 60 of shroud 14 to thereby prevent any conventional wrench from turning the nut actuating body 13. It is quite evident that since shroud 14 and cap 15 are freely rotatable on actuating body 13, they cannot be rotated to turn hydrant nut 11.

Figures 1, 2, 3:
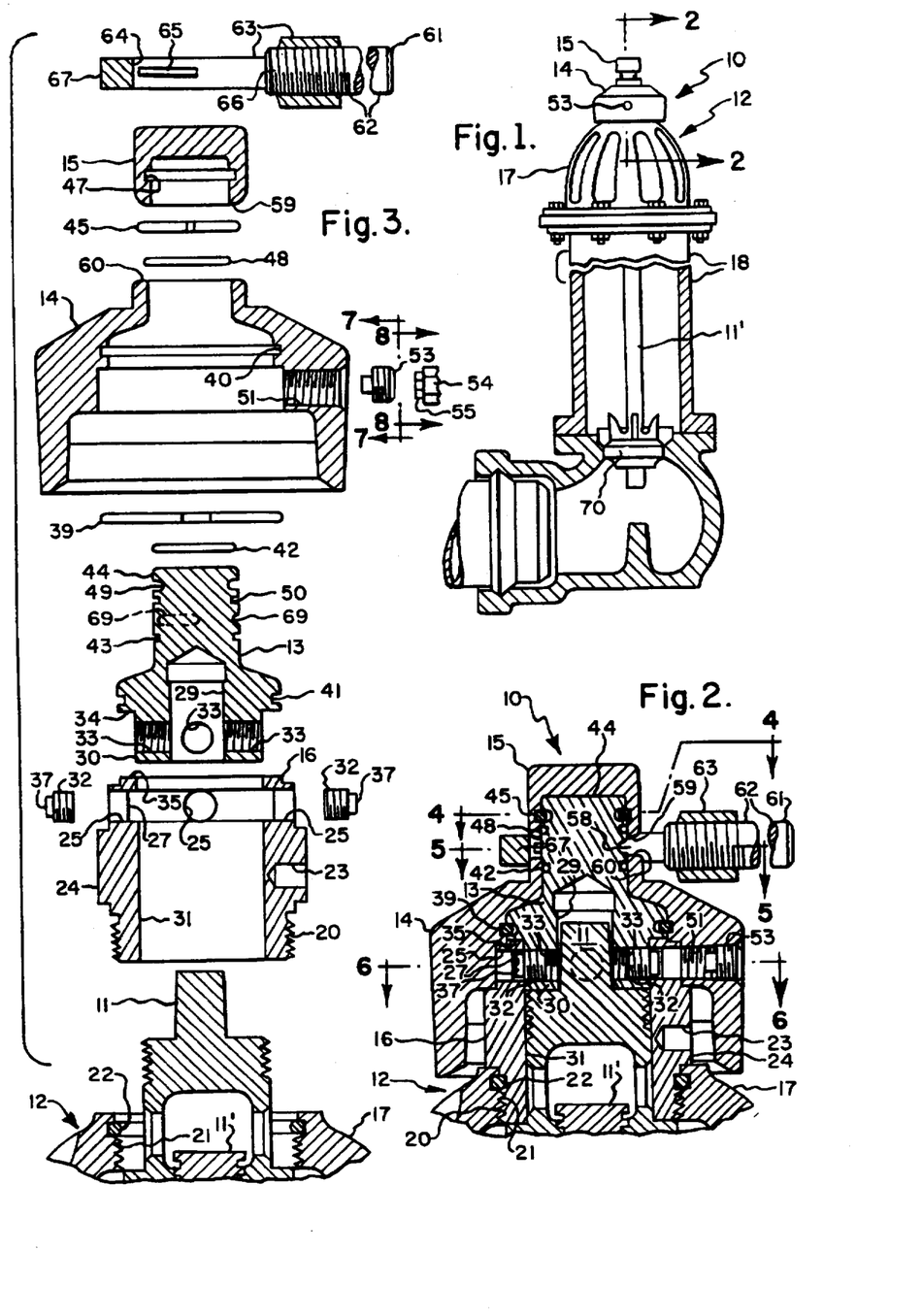
FIG. 1 is a fragmentary side elevational view, partially in cross section, of the improved tamper resistant construction of the present invention mounted on a fire hydrant.
FIG. 2 is a fragmentary enlarged cross sectional view taken substantially along line 2—2 of FIG. 1 and showing an actuating wrench in position on the tamper resistant construction.
FIG. 3 is an exploded cross sectional view showing all of the parts of the tamper resistant construction including the wrench, the hole closing plug and the key therefor.
Figure 4:
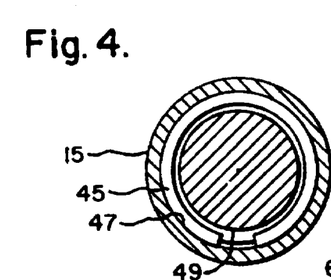
FIG. 4 is a cross sectional view taken substantially along line 4—4 of FIG. 2 and showing the snap ring which rotatably locks the cap to the upper portion of the hydrant nut actuating body.
Figure 5:
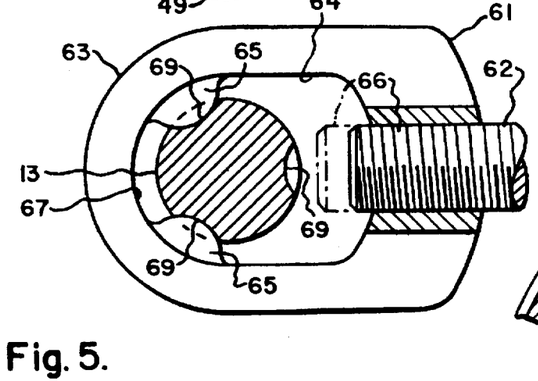
FIG. 5 is a fragmentary cross sectional view taken substantially along line 5—5 of FIG. 2 and showing the wrench in position on the hydrant nut actuating body of the tamper resistant construction.

A special wrench 61 is provided having an elongated handle 62 which has a threaded end 66 which threads into wrench head 63 having an opening 64 which can be passed over cap 15 until lugs 65 are aligned with the narrow space 58 between the edges 59 and 60 of cap 15 and shroud 14, respectively. Thereafter, handle 62 is threaded into wrench head 63 so that it moves from its solid line position in FIG. 5 to its dotted line position to thereby abut the sides of cap 15 and shroud 14. At this time the projections 65 on wrench head 63 will enter two of the equally spaced depressions 69 in hydrant nut actuating body 13 to thus cause the wrench to grip it. Thereafter, wrench 61 can be turned to turn hydrant nut actuating body 13 and hydrant nut 11 a desired amount to either open or close the hydrant. In this respect, the hydrant valve actuating body 13 is coupled to the hydrant valve 70 by hydrant shaft 11' which is connected to hydrant actuating nut 11 which is at the upper end of shaft 11'.

It can thus be seen that by virtue of the above-described construction any pounding which is applied to cap 15 or shroud 14 will be transmitted directly to hydrant top 17 and thereafter to hydrant body 18 and not directly to the hydrant nut 11, as in the structure of the above-mentioned prior U.S. Pat. No. 4,936,336.

While the above description has shown the packing nut 16 to have a plurality of bores 25 each of which is alignable with one of the plurality of bores 33 of the hydrant nut actuating body 13, it will be appreciated that the packing ring can optionally have only a single bore 25. In the latter instance, the hydrant nut actuating body 13 would have to be rotated to align each of the bores 33 with the aligned bores 25 and 51 of the packing nut 16 and shroud 14, respectively, so that access could be had to the stud 32 in each bore 33.

It is to be especially noted that the connection between the studs 32 and groove 25 of packing nut 16 resists the prying up of shroud 14 more than the construction of U.S. Pat. No. 4,936,336 does because there is less leverage, and in the prior device of the patent, the harder pointed set screws can be forced to move along the softer hydrant nut.

In FIGS. 10–16 additional embodiments of the present invention are disclosed. Summarizing briefly in advance, these embodiments utilize a snap ring to mount the shroud on the packing nut, rather than securing these components by means of the plurality of studs 32 described above relative to FIGS. 1–9. In addition, the embodiments of FIGS. 10–16 include a cap structure such as shown in copending application Ser. No. 08/652,633, filed Jun. 7, 1996, now U.S. Pat. No. 5,632,301, which is incorporated herein by reference.

In the embodiment of FIGS. 10–13, tamper resistant construction 70 includes a packing nut 71 which is threadably secured to a hydrant cover 68 at threaded connection 69 with an O-ring 67 therebetween. Packing nut 71 is part of an assembly which includes shroud 72 which is permanently secured to packing nut 71 by means of a snap ring 73 which is analogous to snap ring 39 of FIG. 3. A hydrant nut actuating body 13', which is analogous to hydrant nut actuating body 13 of FIG. 3, includes an annular rim 74 which is rotatably captured between shoulder 75 of packing nut 71 and shoulder 77 of shroud 72, which constitutes a rotatable connection between the hydrant nut actuating body 13' and shroud 72. Hydrant nut actuating body 13' includes a polygonal bore 79 which receives hydrant nut 80 as fully described above relative to analogous structure in FIG. 2.

Figures 10, 10A, 10B, 11, 12, 13:
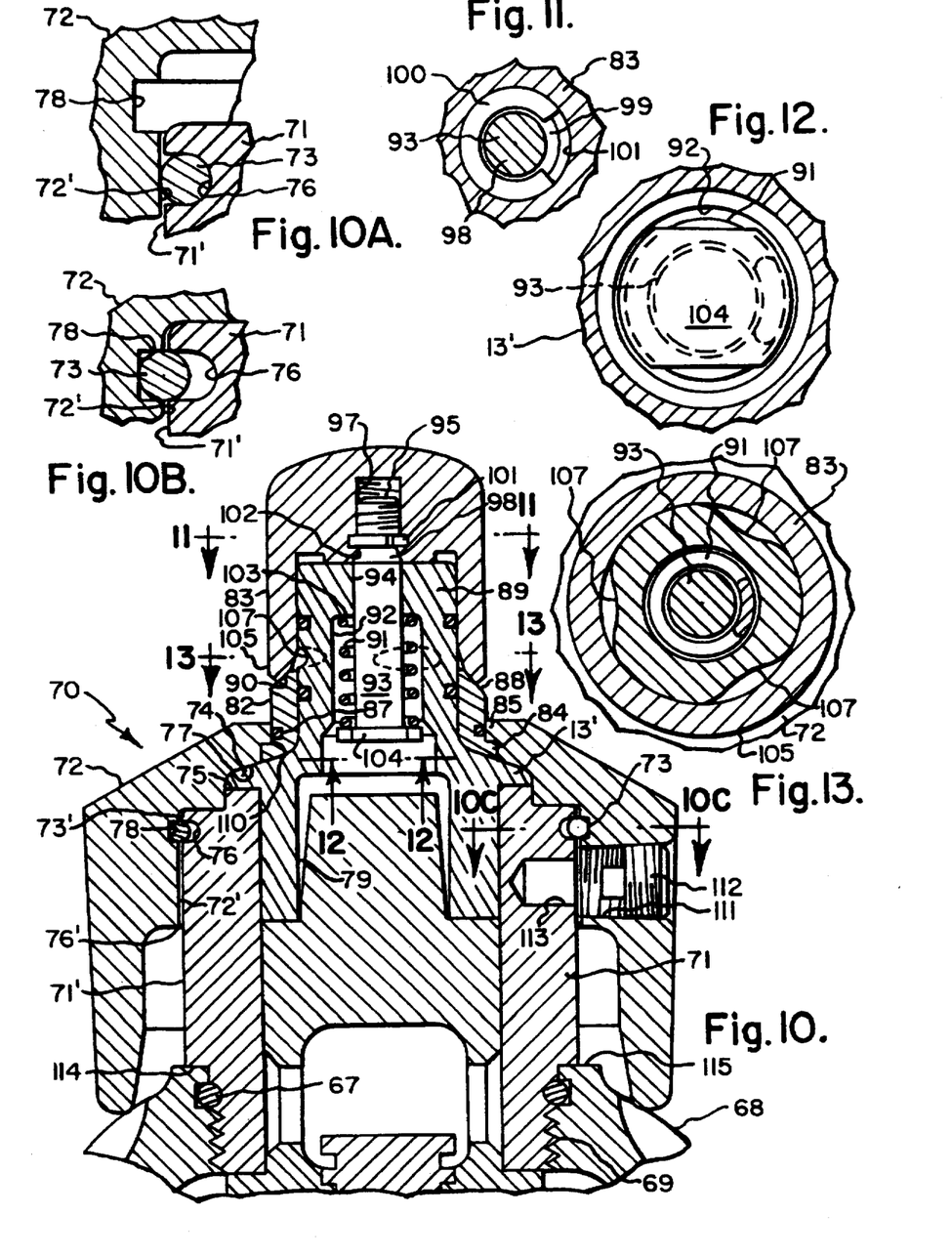
FIG. 10 is a fragmentary enlarged cross sectional view of an alternate embodiment of the present invention showing primarily a permanent rotatable connection between the shroud and the packing nut, and also showing a cap which is biased into overlying relationship to the wrench-receiving portion of the hydrant nut actuating body.
FIG. 10A is a fragmentary enlarged portion of FIG. 10 showing the initial stage of mounting the shroud on the packing nut.
FIG. 10B is a view similar to FIG. 10A but showing the shroud in fully assembled relationship on the packing nut.
FIG. 11 is a fragmentary enlarged cross sectional view taken substantially along line 11—11 of FIG. 10.
FIG. 12 is a fragmentary enlarged view taken substantially in the direction of arrows 12—12 of FIG. 10.
FIG. 13 is a fragmentary enlarged cross sectional view taken substantially along line 13—13 of FIG. 10.

A wear ring 82 and a cap 83 are part of the assembly of the hydrant nut actuating body 13', shroud 72, wear ring 82 and cap 83. The wear ring 82 has a lower peripheral annular portion 84 which is captured between rim 85 of shroud 72 and annular rim 74 of hydrant nut actuating body 13'. An O-ring 87 is located in a suitable groove in wear ring 82, as shown. Shroud 72, hydrant nut actuating body 13' and wear ring 82 are rotatable relative to each other.

Cap 83 is mounted on the upper portion 89 of hydrant nut actuating body 13' in such a manner that its lower edge 90 is biased into engagement with upper beveled or tapered edge 88 of wear ring 52 by a spring 91. More specifically, spring 91 is retained in cavity 92 of hydrant nut actuating body 13' by bolt 93 which extends through bore 94. Bolt 93 has a threaded end 95 which is received in threaded bore 97 of cap 83. A groove 99 in bolt 93 adjacent threaded end 95 receives snap ring 100 prior to the time that threaded end 95 is threaded into threaded bore 97. The spring 91 is mounted on the stem 98 of bolt 93, and when threaded end 95 is threaded into threaded bore 97, snap ring 100 will be compressed as it is forced through tapered counterbore 102 of cap 83. A point will be reached where snap ring 100 is abreast of groove 101 in cap 83, and it will then snap into groove 101 so that it will bridge groove 99 of bolt 93 and groove 101 of cap 83 to thereby retain cap 83 permanently and freely rotatably assembled on hydrant nut actuating body 13'. The wear ring 82 is captured between the cap 83 and shroud 72, and all three are rotatable on hydrant nut actuating body 13'.

The resulting threading of bolt 93 into cap 83 will cause spring 91 to be compressed. In this respect the upper end of spring 91 bears against shoulder 103 of hydrant nut actuating body 13' and its lower end bears against head 104 of bolt 93. The spring 91 has a high spring rate, and in the present instance it is contemplated that it will have a spring rate of between 50 and 1,200 pounds per inch so that when it is compressed incidental to being assembled between hydrant nut actuating body 13' and cap 83, up to numerous hundreds of pounds of force could be required to be applied between lower edge 90 of cap 83 and beveled edge 88 of wear ring 82 to force cap 83 away from wear ring 82 to obtain access to wrench-receiving grooves 107 for turning hydrant nut actuating body 13'. In the foregoing respect the lower edge portion 105 of cap 83 covers wrench-receiving grooves 107 (FIG. 13) in hydrant nut actuating body 13' thereby rendering such grooves covered and inaccessible without the use of a specialized wrench which is used to force cap 83 upwardly against the bias of spring 91. Different spring rates may be selected to provide different levels of security as well as the difficulty of operation, as desired by the ultimate user.

The foregoing cap and related structure is described in detail in copending application Ser. No. 08/652,633, filed Jun. 7, 1996, now U.S. Pat. No. 5,632,301, dated May 27, 1997, which is incorporated herein by reference. More specifically the structure is shown in the foregoing patent in FIGS. 2, 9, 10, 11 and 2A. A wrench which is utilized to bias cap 83 away from wear ring 82 is shown in FIGS. 12–15 and the accompanying text of said U.S. Pat. No. 5,632,301, and this subject matter is also incorporated herein by reference.

In accordance with one aspect of the present invention as shown in FIGS. 10–13, the shroud 72 is permanently mounted on packing nut 71 by means of snap ring 73 before the packing nut 71 is threaded into hydrant cover 68. This differs from the type of mounting utilizing studs 32 described above and shown in FIGS. 2 and 6. The snap ring 73 may be of the type shown at 39 in FIG. 3 and it is installed in a conventional manner in which snap ring 39 was installed, which is broadly depicted in FIGS. 10A, 10B and 10C relative to the embodiment of FIGS. 10–13. In this respect snap ring 73 is initially biased into groove 76 of packing nut 71 by means of a sleeve (not shown) which is passed over the entire external cylindrical surfaces 71' and 73' on opposite sides of groove 76 of packing nut 71. The sleeve is thereafter withdrawn downwardly along surfaces 73' and 71' of the packing nut as the end 76' of shroud 72, which is in contact with the edge of the sleeve, is moved downwardly onto surfaces 73' and 71'. After the sleeve passes downwardly beyond snap ring 73, cylindrical surface 72' of shroud 72 will engage the outer surface of snap ring 73 and cause it to be maintained in groove 76 until such time as groove 78 of shroud 72 is abreast of groove 76 of packing nut 71, at which time snap ring 73 will move from its position of FIG. 10A to its position of FIGS. 10B and 10C wherein it bridges grooves 76 and 78 to thereby retain shroud 72 permanently mounted on packing nut 71. It will be appreciated that the foregoing assembling of shroud 72 onto packing nut 71 is effected before packing nut 71 is threaded into hydrant cover 68 at threaded portions 69. It will be appreciated that the shroud 72 is mounted on hydrant nut actuating body 13' in the foregoing conventional manner after wear ring 82 has been positioned as shown in FIG. 10. However, cap 83 can be mounted on hydrant nut actuating body 13' either before or after the shroud 72, hydrant nut actuating body 13' and wear ring 82 have been assembled. In this respect, the annular opening 110 at the top of shroud 72 is of larger diameter than the outer diameters of both wear ring 82 and cap 83 so that it will slip past them during the assembly process if cap 83 is mounted onto hydrant nut actuating body 13' prior to the time that shroud 72 is assembled with packing nut 71.

Figure 7:
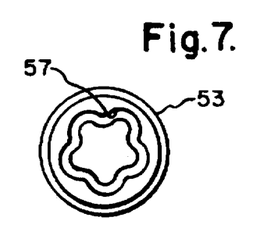
FIG. 7 is a view taken substantially in the direction of arrows 7—7 of FIG. 3 and showing the face of the shroud plug which has a curvilinear groove therein.
Figure 8:
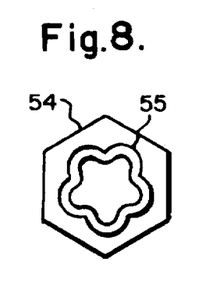
FIG. 8 is a view taken substantially in the direction of arrows 8—8 of FIG. 3 and showing the curvilinear ridge on the key which mates with the curvilinear groove of the plug.

In order to install packing ring 71 with its assembled shroud 72 thereon into hydrant cover 68, the bore 111 in shroud 72, with plug 112 removed therefrom, is aligned with bore 113 of packing nut 71. A suitable rod (not shown) is then passed through bore 111 into aligned bore 113, and thereafter packing nut 71 can be rotatably threaded into hydrant cover 68 at threads 69. After hydrant nut 71 has been fully threaded into position so that annular shoulder 114 of packing nut 71 bears onto annular shoulder 115 of hydrant cover 68, the rod (not shown) is removed from bore 113, and plug 112 is threaded into bore 111. At this point it is to be noted that plug 112 can be identical to plug 53 of FIGS. 2, 3, 6 and 7. In this respect it has a curvilinear groove 57, such as shown in FIG. 7, and it is threaded into and out of bore 111 by means of a key or wrench 54 shown in FIGS. 3 and 8.

The advantage of the embodiment of FIGS. 10–13 over the embodiment of FIGS. 1–9 is that there are less parts and further the assembly of the hydrant nut actuating body 13', shroud 72, packing nut 71 and cap 83 can be installed as a unit simply by inserting a rod into bore 113 of packing nut 71 and turning the entire assembly into position, prior to the time that plug 112 is inserted into bore 111 to prevent unauthorized access to bore 113. Thus, the previous manipulation of plugs 32 as described above relative to FIGS. 1–9 is eliminated.

Figures 10C, 14, 14A, 14B:
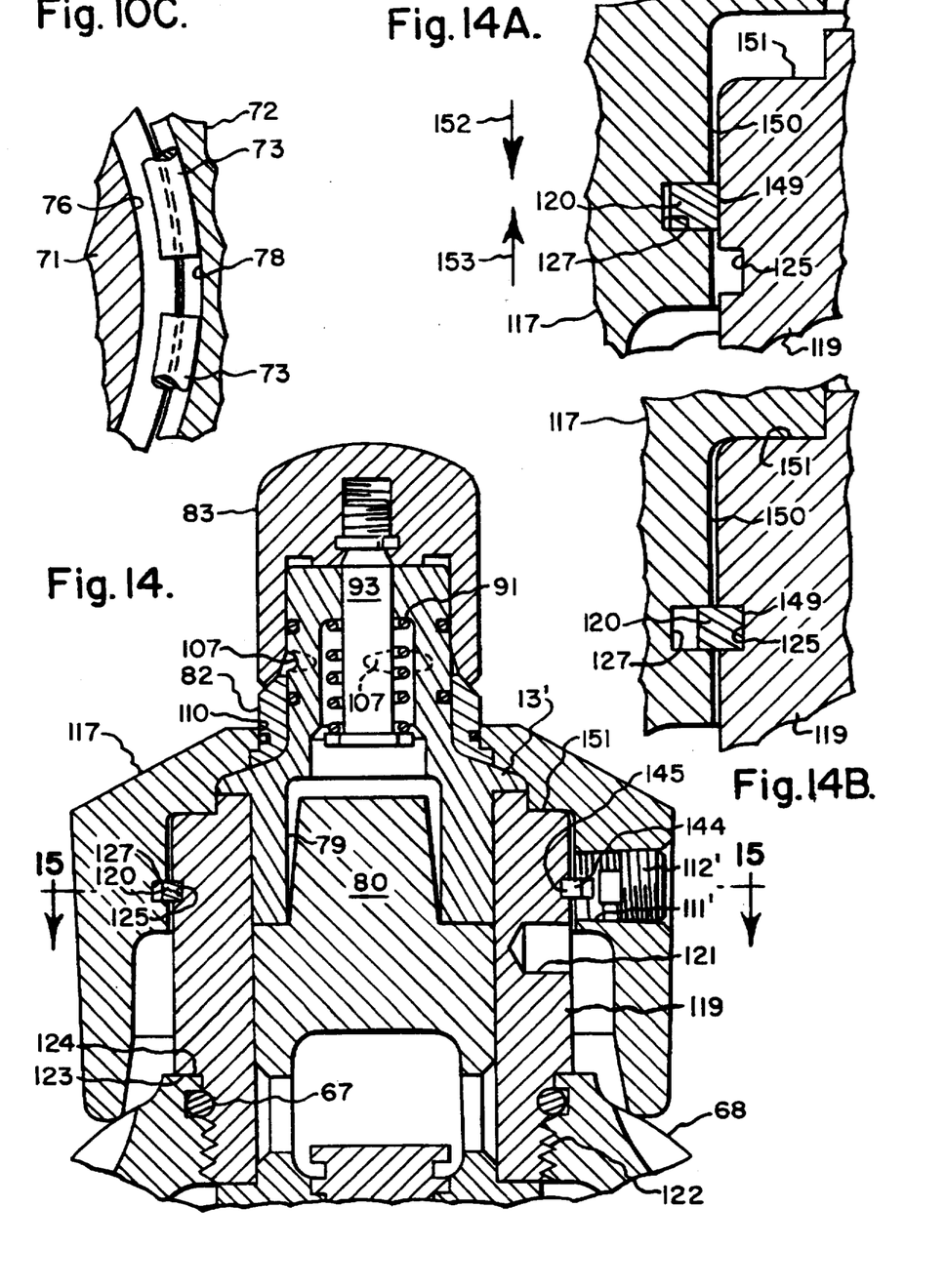
FIG. 10C is a fragmentary cross sectional view taken substantially along line 10C—10C of FIG. 10 and showing the snap ring of FIG. 10 in the position wherein it rotatably permanently mounts the shroud on the packing ring.
FIG. 14 is a fragmentary enlarged cross sectional view of a further embodiment of the present invention wherein the shroud is removably rotatably mounted on the packing nut by a snap ring.
FIG. 14A is an enlarged fragmentary cross sectional view showing the initial stage of mounting the shroud on the packing ring.
FIG. 14B is a view similar to FIG. 14A but showing the shroud in fully mounted position on the packing ring.
Figures 15, 16, 16A, 16B, 16C:
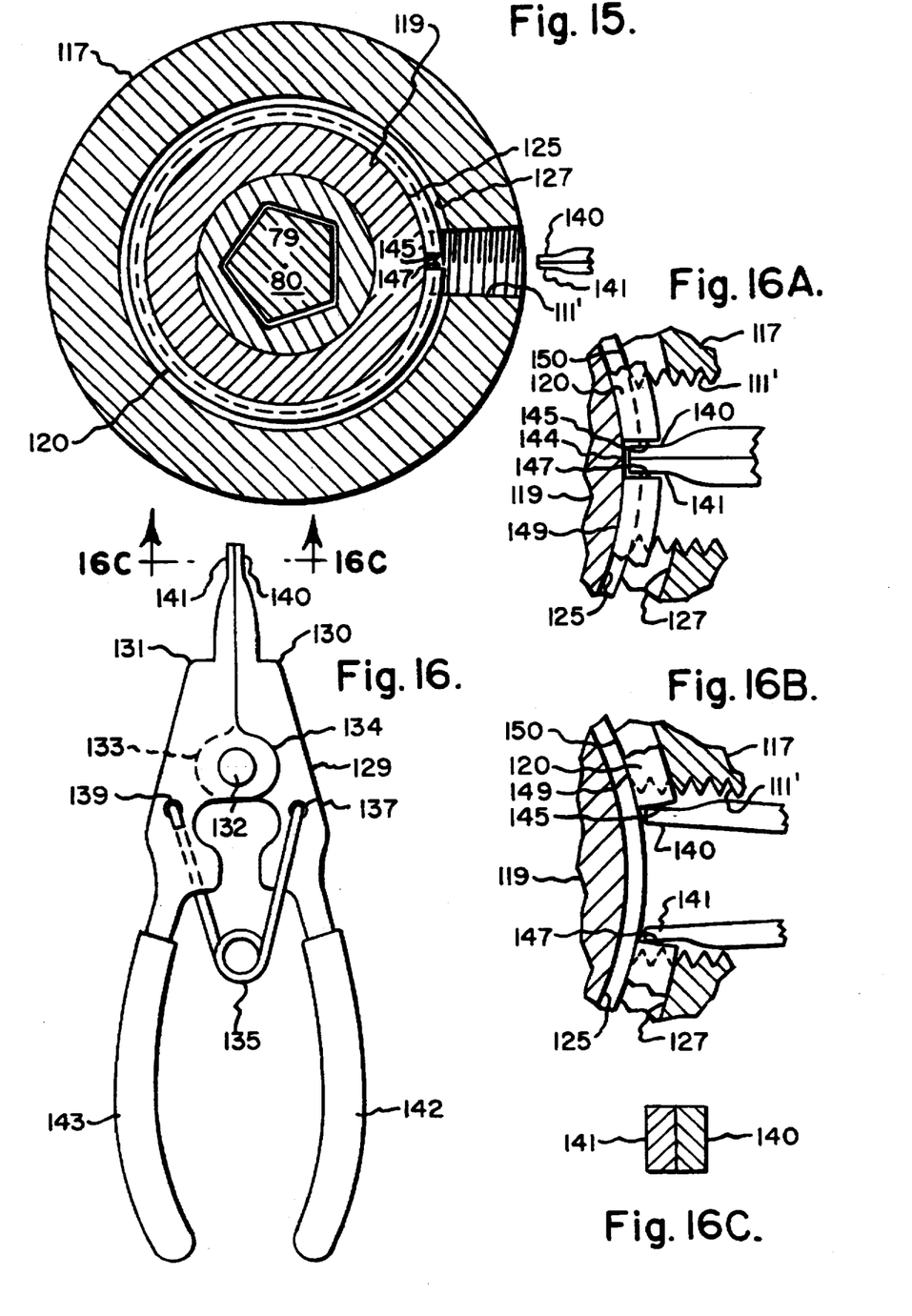
FIG. 15 is a reduced cross sectional view taken substantially along line 15—15 of FIG. 14 and showing the tip of a spreader tool in position to enter the bore in the shroud.
FIG. 16 is a plan view of a spreader tool for spreading the snap ring during mounting and dismounting the shroud from the packing nut.
FIG. 16A is a fragmentary enlarged cross sectional view of a portion of FIG. 15 and showing the tip of the spreader tool in position for expanding the snap ring.
FIG. 16B is a view similar to FIG. 16A and showing the snap ring expanded into the groove of the shroud by the spreader tool.
FIG. 16C is an enlarged cross sectional view taken substantially along line 16C—16C of FIG. 16.

In FIGS. 14–16, a modification of the embodiment of FIGS. 10–13 is disclosed wherein the shroud 117 is removably mounted onto packing nut 119 by means of a snap ring 120 of square cross section. At this point it is to be noted that hydrant nut actuating body 13', cap 83, bolt 93, spring 91 and wear ring 82 are identical to like numbered parts disclosed and described in FIGS. 10–13. Accordingly, except for the use of the general numerals set forth above, the detailed description of the structure of these parts will be omitted at this juncture.

In the embodiment of FIGS. 14–16, the packing nut 119 is initially threaded into hydrant cover 68. In this respect, a bore 121 is located in packing nut 119 and it receives a suitable wrench or rod for turning packing nut 119 into threaded engagement with threads 122 of hydrant cover 68. After the threading has been completed so that shoulder 123 of packing nut 119 bears onto shoulder 124 of hydrant cover 68, the mounting of packing nut 119 is completed.

Thereafter, a subassembly of hydrant nut actuating body 13', wear ring 82 and cap 83 are installed so that cavity 79 of hydrant nut actuating body 13' receives hydrant nut 80, and the parts are positioned as shown in FIG. 14. Shroud 117 is then installed onto packing nut 119. In this respect, plug 112', which may be identical to plug 112 of FIG. 10 which is identical to plug 53 of FIGS. 1–9, is removed from bore 111'. A snap ring 120, which biases itself inwardly to a diameter which tends to force it into groove 125 of packing nut 119, is initially popped into a position wherein it extends partially into shroud groove 127 before shroud 117 is mounted onto packing nut 119. Thereafter, snap ring 120 is expanded so it fully occupies groove 127 of shroud 117 as shown in FIG. 16B. To this end a spreader tool 129 is provided which consists of two substantially mirror-image halves 130 and 131 which are pivotally connected to each other by a pin 132 which extends through lobes 133 and 134 of members 130 and 131, respectively. A spring 135 has ends which are received in bores 137 and 139 of members 130 and 131, respectively, to bias the rectangular tips 140 and 141, respectively, to a closed position shown in FIG. 16. When handles 142 and 143 are pressed toward each other against the bias of spring 135, tips 140 and 141 will spread apart to the position shown in FIG. 16B. Accordingly, in order to expand snap ring 120 into the position shown in FIG. 16B wherein it is fully contained in shroud groove 127, the tips 140 and 141 are inserted through bore 111' of shroud 117 and caused to enter gap 144 (FIG. 16A) between square ends 145 and 147 of snap ring 120. When handles 142 and 143 are moved toward each other, the tips 140 and 141 will spread ends 145 and 147 and expand snap ring 120 so that it is fully contained in groove 127 in shroud 117, as shown in FIG. 16B. In this position, the inner surface 149 of snap ring 120 will not protrude beyond the inner surface 150 (FIG. 16B) of shroud 117. When snap ring 120 is in this position, it will clear shoulder 151 (FIG. 14) of packing nut 119 so that it can occupy a position such as shown in FIG. 14A after the tips 140 and 141 of spreader 129 are removed from gap 144. The shroud 117 can thereafter be moved downwardly in the direction of arrow 152 until grooves 127 and 125 are abreast of each other, as shown in FIG. 14B, and thereafter snap ring 120 will snap into groove 125 so that it will bridge grooves 125 and 127 to maintain the shroud rotatably mounted on packing ring 119.

If it is desired to remove shroud 117 from its rotatable engagement with packing nut 119, it is merely necessary to insert the tips 140 and 141 into gap 144 (FIG. 16A) after they have been inserted through threaded bore 111'. Thereafter, when tips 140 and 141 are spread apart to the position shown in FIG. 16B, this will cause snap ring 120 to be contained fully in groove 127, whereupon it no longer bridges grooves 127 and 125 so that shroud 117 can be lifted upwardly in the direction of arrow 153 (FIG. 14A) so that shroud 117 can be removed from packing nut 119.

The advantage of the embodiment of FIGS. 14–16 over the embodiment of FIGS. 10–13 is that shroud 117 is removable for replacement, if desired, and further, it permits the shroud 117 to be sold independently of the subassembly of the cap 83, wear ring 82 and hydrant nut actuating body 13'. Furthermore, the removal of shroud 117 permits the subassembly of the hydrant nut actuating body 13', wear ring 82 and cap 83 to be removed from its assembled relationship with hydrant nut 80.

While preferred embodiments of the present invention has been disclosed, it will be appreciated that it is not limited thereto but may be otherwise embodied within the scope of the following claims.

We claim:

1. In a fire hydrant having a hydrant body and a hydrant cover mounted on said hydrant body and a hydrant shaft having an upper portion with a valve-actuating polygonal nut positioned at said upper portion of said hydrant shaft and extending outwardly from said hydrant cover, a construction for rendering said nut tamper resistant against unauthorized actuation comprising a packing nut mounted in said hydrant cover proximate to said upper portion of said hydrant shaft, a hydrant nut actuating body, a recess in said hydrant nut actuating body for receiving said polygonal nut in turning relationship, a shroud positioned in encircling relationship to said packing nut and having a lower portion positioned proximate said hydrant cover, a first rotatable connection between said shroud and said packing nut for permitting free rotation of said shroud on said packing nut, a cap mounted on said hydrant nut actuating body proximate said shroud, and a second rotatable connection between said cap and said hydrant nut actuating body.

2. In a fire hydrant as set forth in claim 1 wherein said first rotatable connection comprises a snap ring located in opposed grooves in said shroud and said packing nut.

3. In a fire hydrant as set forth in claim 2 wherein said second rotatable connection comprises a second snap ring between opposed grooves in said cap and said hydrant nut actuating body.

4. In a fire hydrant as set forth in claim 2 wherein said snap ring includes a gap, and a bore in said shroud for selective alignment with said gap in said snap ring.

5. In a fire hydrant as set forth in claim 4 including a threaded plug in said bore, and a key for turning said threaded plug.

6. In a fire hydrant as set forth in claim 2 including a first bore in said shroud which is offset from said snap ring, and a second bore in said packing nut in alignment with said first bore.

7. In a fire hydrant as set forth in claim 1 wherein said hydrant nut actuating body includes a wrench-receiving configuration for receiving a wrench for turning said hydrant nut actuating body and said hydrant nut therein.

8. In a fire hydrant as set forth in claim 7 wherein said cap overlies said wrench-receiving configuration.

9. In a fire hydrant as set forth in claim 7 wherein said cap is spring-biased in overlying relationship to said wrench-receiving configuration.

10. In a fire hydrant as set forth in claim 7 wherein said first rotatable connection comprises a snap ring located in opposed grooves in said shroud and said packing nut.

11. In a fire hydrant as set forth in claim 10 wherein said snap ring includes a gap, and a bore in said shroud for selective alignment with said gap in said snap ring.

12. In a fire hydrant as set forth in claim 7 including a first bore in said shroud which is offset from said snap ring, and a second bore in said packing nut in alignment with said first bore.

13. A construction for rendering a hydrant nut tamper resistant comprising a packing nut, a hydrant nut actuating body having upper and lower ends with said lower end positioned within said packing nut, an opening in said lower end of said hydrant nut actuating body for receiving a hydrant nut, a shroud rotatably mounted on said packing nut, and a cap rotatably mounted on said hydrant nut actuating body proximate said shroud.

14. A construction as set forth in claim 13 wherein said shroud is rotatably mounted on said packing nut by a snap ring which extends between aligned grooves in said packing nut and said shroud.

15. A construction as set forth in claim 14 wherein said cap is rotatably mounted on said hydrant nut actuating body by a second snap ring which extends between aligned second grooves in said hydrant nut actuating body and said cap.

16. A construction as set forth in claim 14 wherein said snap ring includes a gap, and a bore in said shroud for selective alignment with said gap in said snap ring.

17. A construction as set forth in claim 16 including a threaded plug in said bore, and a key for turning said threaded plug.

18. A construction as set forth in claim 14 including a first bore in said shroud which is offset from said snap ring, and a second bore in said packing nut in alignment with said first bore.

19. A construction as set forth in claim 18 including a threaded plug in said first bore, and a key for turning said threaded plug.

20. A construction as set forth in claim 13 wherein said hydrant nut actuating body includes a wrench-receiving configuration for receiving a wrench for turning said hydrant nut actuating body and said hydrant nut therein.

21. A construction as set forth in claim 20 wherein said cap overlies said wrench-receiving configuration.

22. A construction as set forth in claim 20 wherein said cap is spring-biased in overlying relationship to said wrench-receiving configuration.

23. A construction as set forth in claim 20 wherein said shroud is rotatably mounted on said packing nut by a snap ring located in opposed grooves in said shroud and said packing nut.

24. A construction as set forth in claim 23 wherein said snap ring includes a gap, and a bore in said shroud for selective alignment with said gap in said snap ring.

25. A construction as set forth in claim 23 including a first bore in said shroud which is offset from said snap ring, and a second bore in said packing nut in alignment with said first bore.

26. A tamper resistant construction for preventing unauthorized actuation of a fire hydrant comprising a packing nut, a hydrant nut actuating body rotatably mounted on said packing nut, a shroud, and a rotatable connection between said hydrant nut actuating body and said shroud.

27. A tamper resistant construction as set forth in claim 26 including a second rotatable connection between said shroud and said packing nut.

28. A tamper resistant construction as set forth in claim 27 wherein said second rotatable connection comprises a snap ring.

29. A tamper resistant construction as set forth in claim 28 wherein said snap ring is permanently installed between said shroud and said packing nut.

30. A tamper resistant construction as set forth in claim 28 wherein said snap ring is accessible to permit disengagement of said second rotatable connection between said packing nut and said shroud.

31. A tamper resistant construction as set forth in claim 30 including a cap having a first diameter rotatably mounted on said hydrant nut actuating body, and an opening in said shroud of a second diameter which is larger than said first diameter for permitting said shroud to slip over said cap after said rotatable connection has been disengaged.

32. A construction for rendering a hydrant nut tamper resistant comprising a packing nut, a hydrant nut actuating body having upper and lower ends with said lower end positioned within said packing nut, an opening in said lower end of said hydrant nut actuating body for receiving a hydrant nut, and a shroud rotatably mounted on said packing nut.

33. A construction as set forth in claim 32 wherein said shroud is rotatably mounted on said packing nut by a snap ring.

* * * * *